(12) United States Patent
Bogue et al.

(10) Patent No.: US 8,128,100 B2
(45) Date of Patent: Mar. 6, 2012

(54) LAMINATE AIR SEAL FOR A GAS TURBINE ENGINE

(75) Inventors: William F. Bogue, Hebron, CT (US); Daniel M. Stadtlander, West Hartford, CT (US); Charles R. Watson, Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 1322 days.

(21) Appl. No.: 11/999,355

(22) Filed: Dec. 5, 2007

(65) Prior Publication Data

US 2009/0148275 A1   Jun. 11, 2009

(51) Int. Cl.
*F16J 15/12* (2006.01)
(52) U.S. Cl. .................. 277/650; 415/214.1; 415/211.2
(58) Field of Classification Search .................. 277/650, 277/652
See application file for complete search history.

(56) References Cited

U.S. PATENT DOCUMENTS

| | | | |
|---|---|---|---|
| 2,840,343 A * | 6/1958 | Brandt, Jr. et al. ......... | 415/173.4 |
| 4,165,404 A * | 8/1979 | Quehl ........................... | 428/212 |
| 4,354,012 A | 10/1982 | Scola | |
| 4,356,678 A | 11/1982 | Andrews et al. | |
| 4,412,884 A | 11/1983 | Scola | |
| 4,569,988 A | 2/1986 | Scola et al. | |
| 4,624,727 A | 11/1986 | Scola et al. | |
| 4,631,335 A | 12/1986 | Scola et al. | |
| 4,645,217 A * | 2/1987 | Honeycutt, Jr. et al. ...... | 277/555 |
| 4,742,152 A | 5/1988 | Scola | |
| 4,767,656 A | 8/1988 | Chee et al. | |
| 4,895,378 A | 1/1990 | Newquist et al. | |
| 4,983,463 A | 1/1991 | Minford et al. | |
| 5,122,226 A | 6/1992 | Minford et al. | |
| 5,181,728 A * | 1/1993 | Stec .............................. | 277/355 |
| 5,226,789 A | 7/1993 | Donges | |
| 5,251,435 A * | 10/1993 | Pauley ......................... | 60/226.1 |
| 5,298,601 A | 3/1994 | Scola | |
| 5,304,338 A | 4/1994 | Hertel et al. | |
| 5,486,096 A * | 1/1996 | Hertel et al. ................... | 416/224 |
| 5,524,846 A * | 6/1996 | Shine et al. ................... | 244/53 R |
| 6,637,186 B1 * | 10/2003 | Van Duyn ....................... | 60/223 |

(Continued)

FOREIGN PATENT DOCUMENTS

EP       1529950       5/2005

(Continued)

OTHER PUBLICATIONS

Apr. 2, 2009 European Search Report.

*Primary Examiner* — Gilbert Lee
(74) *Attorney, Agent, or Firm* — Kinney & Lange, P.A.

(57) ABSTRACT

A laminate air seal for a gas turbine engine includes at least one fabric layer made of fiberglass, ceramic fiber, basalt and/or carbon, and a polymeric resin that is stable at an operating temperature of the gas turbine engine. The resin may be preimpregnated into the fabric layers, or introduced into the fabric during assembly and formation of the laminate. The resin may be polyimide, bismaelimide (BMI) or cyanate ester. A particular resin selected may depend, in part, on the operating temperatures in that region of the gas turbine engine. In some embodiments, the laminate seal may include a coating to increase lubricity of the seal. In one embodiment, the laminate air seal is used to seal a gap between a pylon fairing and an exhaust nozzle of the turbine engine.

17 Claims, 5 Drawing Sheets

U.S. PATENT DOCUMENTS

| | | |
|---|---|---|
| 6,746,819 B1 | 6/2004 | Schmitz et al. |
| 6,808,364 B2 | 10/2004 | O'Reilly et al. |
| 6,899,339 B2 | 5/2005 | Sanders et al. |
| 7,041,778 B1 | 5/2006 | Curliss et al. |
| 7,118,798 B2 | 10/2006 | Goda et al. |
| 7,121,727 B2 | 10/2006 | Bruce et al. |
| 2003/0111797 A1 | 6/2003 | Chung et al. |
| 2004/0046324 A1* | 3/2004 | McMillan .............. 277/409 |
| 2006/0021218 A1* | 2/2006 | McMillan .............. 29/888.3 |
| 2006/0213199 A1 | 9/2006 | Blanchard et al. |
| 2006/0219845 A1 | 10/2006 | Kismarton |
| 2007/0126187 A1* | 6/2007 | McMillan .............. 277/409 |
| 2007/0172643 A1 | 7/2007 | Krawczyk |

FOREIGN PATENT DOCUMENTS

| | | |
|---|---|---|
| WO | 02073118 | 9/2002 |

* cited by examiner

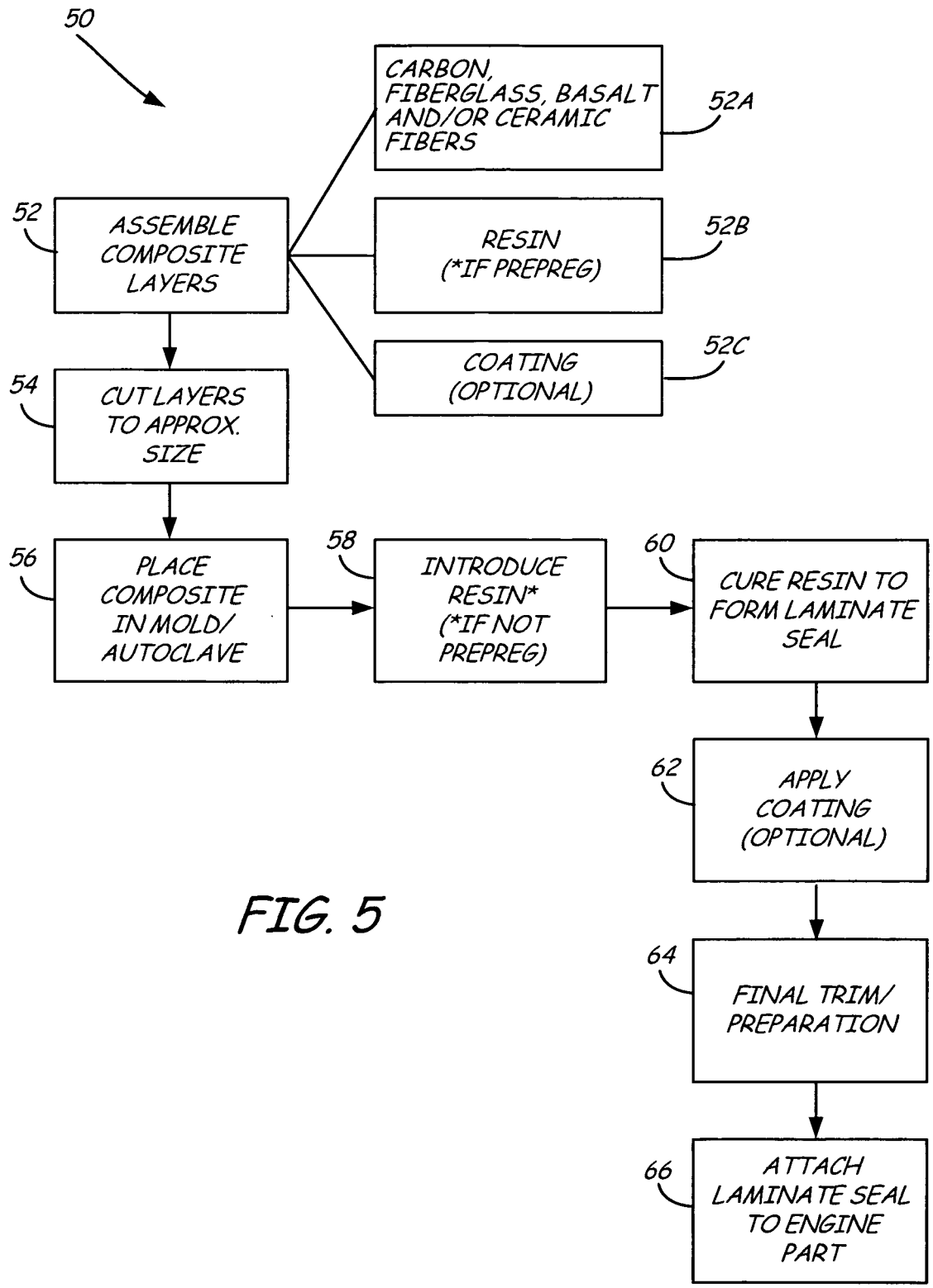

LAMINATE AIR SEAL FOR A GAS TURBINE ENGINE

BACKGROUND

The present invention relates to air seals used in a gas turbine engine. More particularly, the present invention relates to a laminate air seal formed from a composite of fabrics and a polymeric resin stable at an operating temperature of the gas turbine engine.

Seals are frequently used in gas turbine engines to seal air cavities or to at least reduce air flow out of a cavity. These types of air seals are commonly formed of rubber or metal. However, due to high temperatures and vibrations in the engine environment, both the rubber and metal designs have limitations. Rubber, such as silicone rubber, may not be able to withstand high operating temperatures. In some cases, the rubber seal may thermally degrade above a certain temperature and become brittle, which may negatively impact its sealing performance. In contrast, a metal seal may be stable at higher temperatures. However, the metal may cause damage to the engine part that the metal seal contacts. In some cases, a wear strip or a rub strip may be used to protect the underlying part from damage caused by the metal seal. Over time, however, the metal seal may wear through the rub strip and still damage the underlying part.

There is a need for a non-destructive air seal that is stable at the operating conditions of the gas turbine engine.

SUMMARY

The present invention relates to a laminate air seal for a gas turbine engine. The laminate seal includes at least one fabric layer made of carbon, fiberglass, basalt and/or ceramic fibers, and a polymeric resin that is stable at an operating temperature of the gas turbine engine. The resin may be preimpregnated into the fabric layers, or introduced into the fabric during assembly and formation of the laminate. The polymeric resin may be polyimide, bismaelimide (BMI) or cyanate ester. A particular resin selected may depend, in part, on the operating temperatures in that region of the gas turbine engine. In some embodiments, the laminate seal may include a coating to increase lubricity of the seal. In one embodiment, the laminate air seal is used to seal a gap between a pylon fairing and an exhaust nozzle of the turbine engine.

BRIEF DESCRIPTION OF THE DRAWINGS

FIG. 5 is a block diagram illustrating a method of forming a laminate air seal for use in the gas turbine engine.

DETAILED DESCRIPTION

A laminate air seal, as described herein, may be used to seal a gap between a first part and a second part in a gas turbine engine. In an exemplary embodiment, the laminate seal is attached to a pylon fairing of an aircraft to seal a gap between the pylon fairing and the exhaust nozzle of the gas turbine engine. The laminate air seal is formed from a composite of fabrics and a polymeric resin that is stable at an operating temperature of the gas turbine engine. As described below, the laminate seal described herein has improved properties over previous air seal designs.

Figure 1:
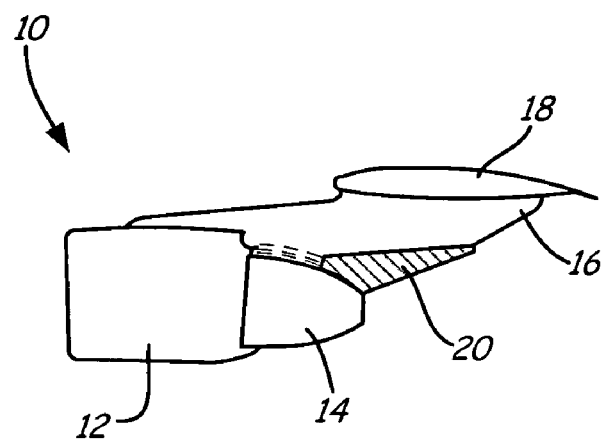
FIG. 1 is a schematic of a gas turbine engine (with an exhaust nozzle), a pylon, and a pylon fairing connecting the engine to the pylon.

FIG. 1 is a schematic of a portion of aircraft 10 including nacelle 12, exhaust nozzle 14, pylon 16, wing 18 and pylon fairing 20. Nacelle 12 is designed to enclose a majority of a gas turbine engine, except for exhaust nozzle 14 which extends out from nacelle 12. Pylon 16 is suspended from wing 18 of aircraft 10 and is used to secure nacelle 12 to wing 18.

Figure 2:
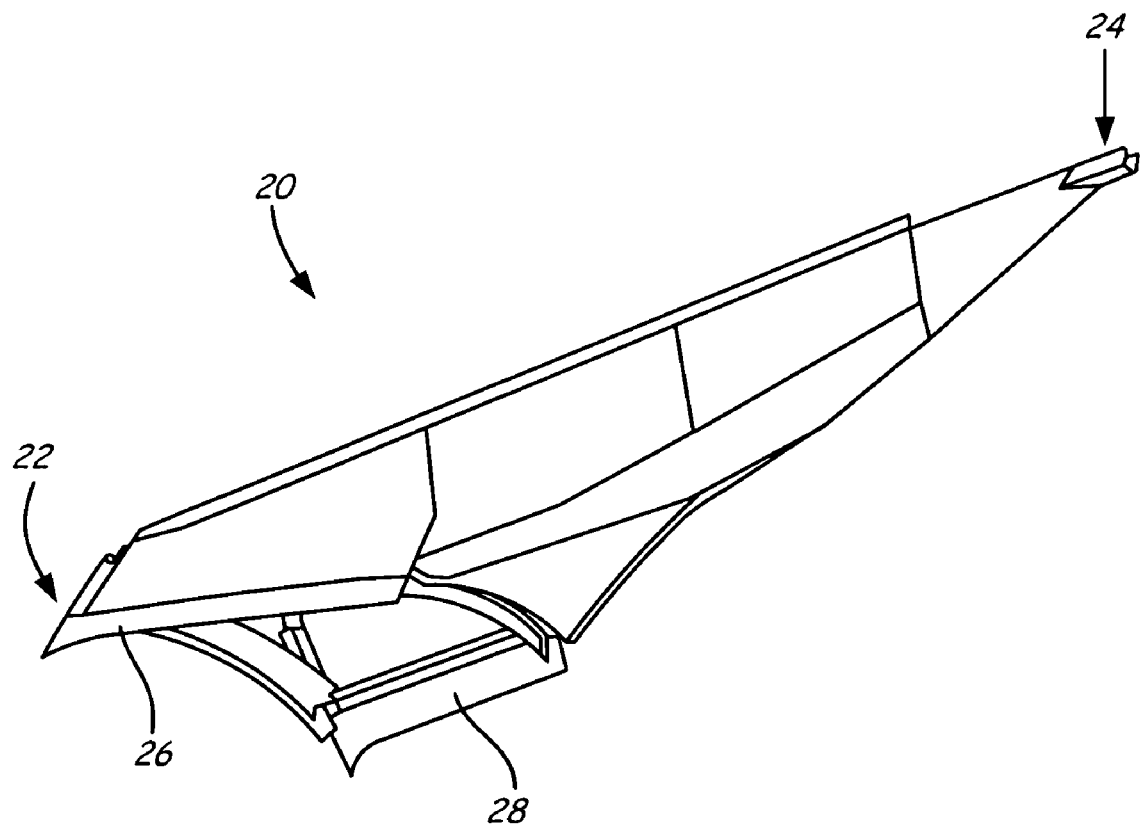
FIG. 2 is an exploded perspective view of the pylon fairing shown in FIG. 1.

FIG. 2 is a perspective view of pylon fairing 20, which is designed as an aerodynamic fairing and attached to an underside of a portion of pylon 16, as shown in FIG. 1. Pylon fairing 20 includes forward portion 22 and aft portion 24. Fairing 20 includes first blade seal 26 and second blade seal 28, both located in forward portion 22 and configured to attach to exhaust nozzle 14 (see FIG. 4), as described below. In addition to its aerodynamic functionality, fairing 20 also acts as an insulator to prevent excessive heat exposure from exhaust nozzle 14 to pylon 16 and wing 18.

Figure 3:
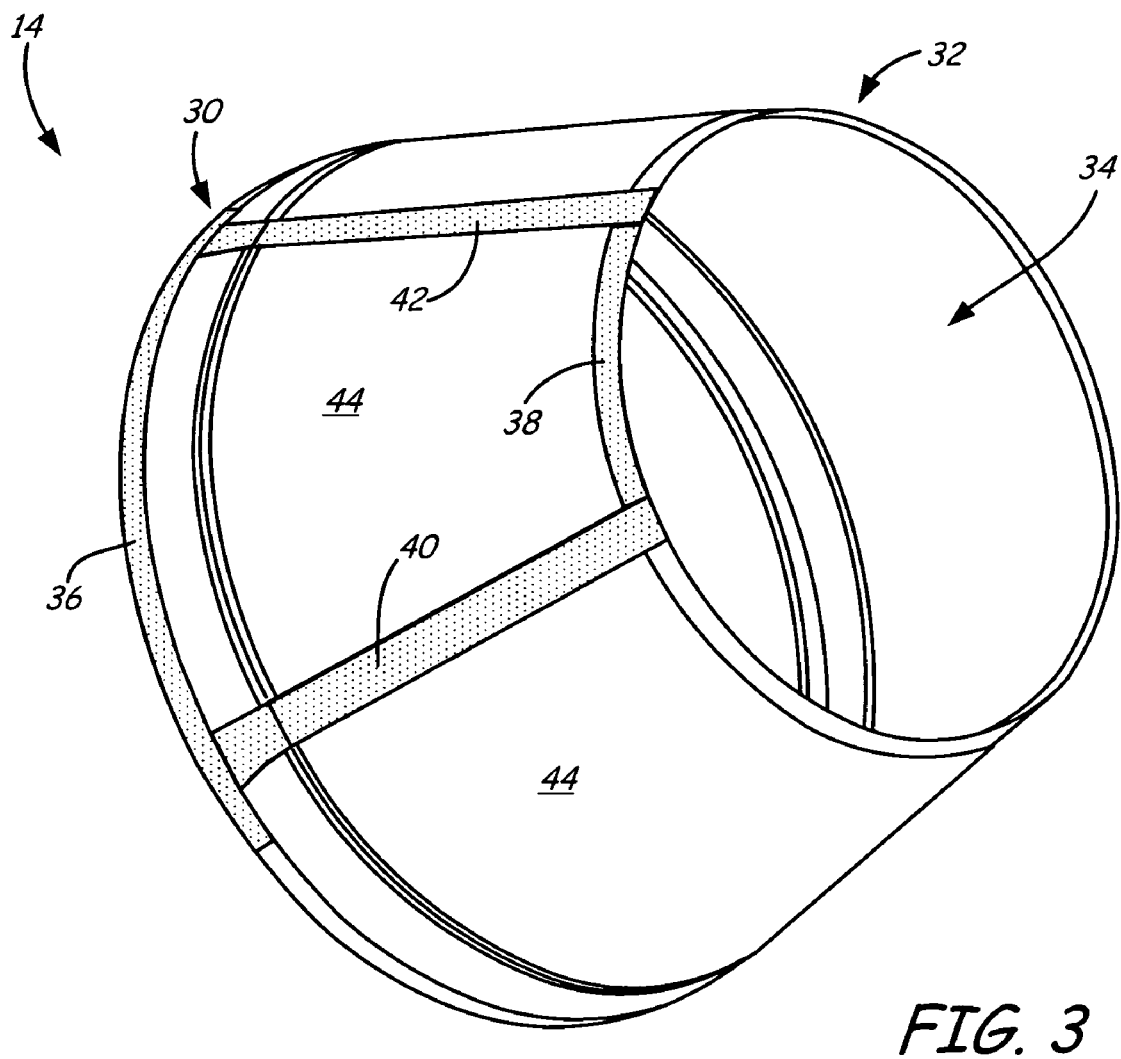
FIG. 3 is an exploded perspective view of the exhaust nozzle shown in FIG. 1, including an outer face skin, and rub strips attached to the face skin.

FIG. 3 is a schematic of exhaust nozzle 14 of FIG. 1, which is located at an aft end of the gas turbine engine and configured to receive hot air after the air passes through turbines of the engine. Exhaust nozzle 14 includes forward portion 30 and aft potion 32 and is designed such that opening 34 in aft portion 32 is smaller than an opening at forward portion 30. This configuration causes the hot air to accelerate as it passes through exhaust nozzle 14, which contributes in part to driving the turbine engine.

In the embodiment shown in FIG. 3, exhaust nozzle 14 includes a pair of rub strips 36 and 38 arranged circumferentially on nozzle 14, and a pair of rub strips 40 and 42 arranged longitudinally on nozzle 14. Circumferential rub strip 36 is located at an end of forward portion 30 and circumferential rub strip 38 is located at an end of aft portion 32. Rub strips 40 and 42 extend between rub strips 36 and 38. (Rub strips 36, 38, 40 and 42 may also be referred to herein as wear strips.) In some embodiments, rub strips 36, 38, 40 and 42 may be formed from metal, such as sheet metal or titanium. In some cases, rub strips 36, 38, 40 and 42 may be a sacrificial layer of exhaust nozzle 14, and may be attached to exhaust nozzle 14 using any known attachment method, including riveting. An outermost layer of exhaust nozzle 14 is outer metal face skin 44, which may be attached to a honeycomb core (not shown). In an exemplary embodiment, face skin 44 is titanium.

Figure 4:
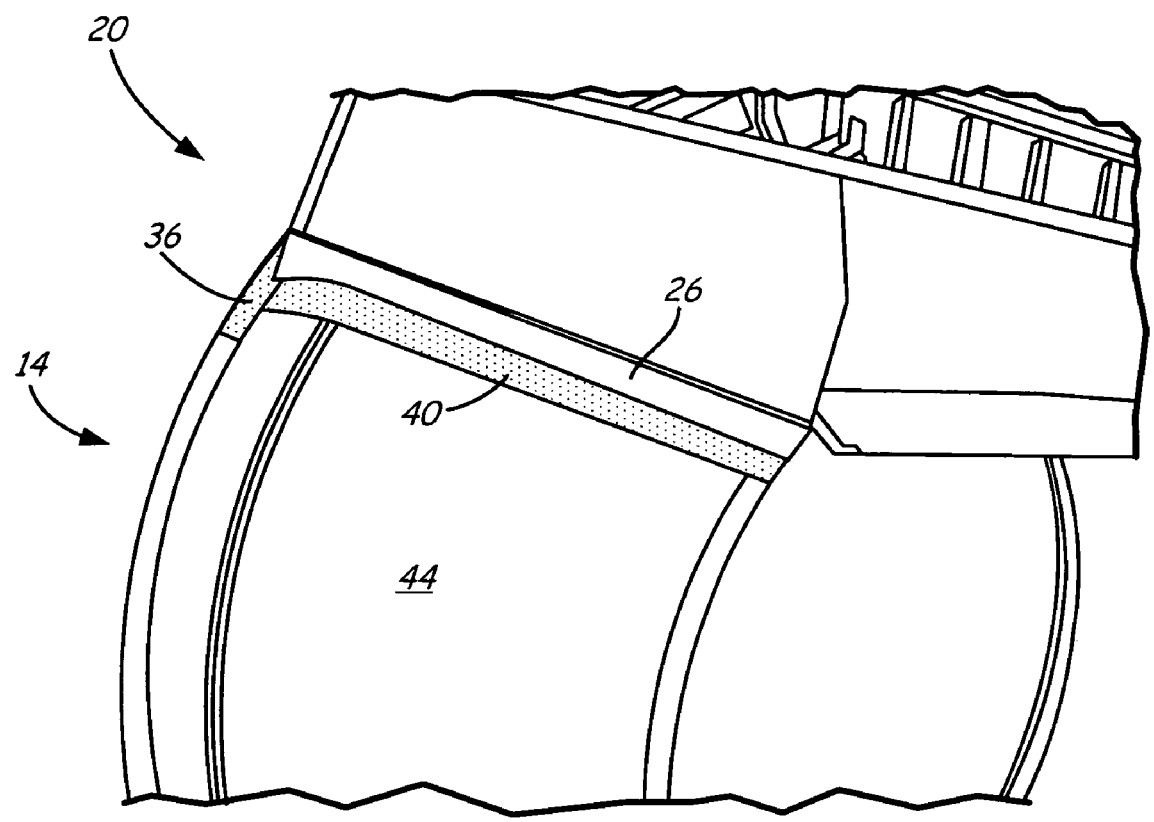
FIG. 4 is a perspective view of a portion of the pylon fairing of FIG. 2 attached to the exhaust nozzle using the rub strips on the exhaust nozzle.

FIG. 4 is a schematic of pylon fairing 20 attached to exhaust nozzle 14 (also shown in FIG. 1). First blade seal 26 is shown attached to radial rub strip 40. Although not visible in FIG. 4, second blade seal 28 is attached to radial rub strip 42. First and second blade seals 26 and 28 are designed to prevent hot air from entering pylon fairing 20.

In some designs, blade seals 26 and 28 are formed of metal. In that case, it is not uncommon for blade seals 26 and 28, over time, to wear through rub strips 40 and 42, respectively, and to then wear through outer face skin 44 located under rub strips 40 and 42. Damage to face skin 44 may impact structural integrity of exhaust nozzle 14 and therefore requires repair.

In other designs, blade seals 26 and 28 are formed of rubber, such as, for example, silicone rubber. However, above a certain temperature, the rubber may thermally degrade and embrittle, which reduces sealing performance of the rubber blade seal.

A laminate air seal is designed to overcome the limitations of the previous designs of blade seals 26 and 28. The laminate air seal is formed from a composite of fabrics and polymeric resin, whereby the resin is cured to form a laminate structure. The selected fabrics and resin are stable at an operating temperature of the gas turbine engine, eliminating problems associated with any thermal degrading of the seal. The laminate seal does not damage underlying face skin 44 of exhaust nozzle 14. Moreover, given the makeup of the laminate, the laminate seal has enough structural flexibility to better follow the contours of nozzle 14 and provide a better sealing structure, as compared to a metal seal design.

FIG. 5 is a block diagram illustrating method 50 for forming a laminate seal for use in a gas turbine engine. In an exemplary embodiment, the laminate seal may be a blade seal, similar to seals 26 and 28 and located between pylon fairing 20 and exhaust nozzle 14. It is recognized that method 50 is not limited to seals for the pylon fairing, and may be used for forming laminate air seals for other areas of the gas turbine engine.

Method 50 includes steps 52-66, and begins with assembling fabric layers 52A to form a composite (step 52). Suitable fabrics are those able to tolerate operating temperatures of the gas turbine engine. In the region of pylon fairing 20 and exhaust nozzle 14, operating temperatures may be between 500 and 600 degrees Fahrenheit (260 and 315 degrees Celsius), or greater. In other areas of the engine where a laminate seal may be used, operating temperatures may be lower; for example, the laminate seal may be exposed to temperatures around 400 degrees Fahrenheit (around 205 degrees Celsius). Fabrics used to form the composite include, but are not limited to carbon, fiberglass, basalt and ceramic fibers. The fabric makeup of the composite may be based, in part, on the temperature range and the structural load of the seal. Fabric layers 52A may include woven, non-woven and/or unidirectional fiber structures. In preferred embodiments, the fabrics are woven. Fiberglass is particularly suitable for wear resistance, whereas carbon may contribute stiffness to the composite.

In some embodiments, fabric layers 52A are preimpregnated with polymeric resin 52B. Alternatively, the resin may be introduced into the fabrics after the composite layers are assembled (see step 58). In some embodiments, the composite includes an optional coating 52C that forms an outermost layer of the laminate. Coating 52C may be a film or a woven material, and is generally designed to add lubricity to the laminate.

Next, in step 54, the assembled layers of the composite are cut to an approximate size and shape of the laminate seal. It is recognized that the fabric layers may be cut separately, prior to assembling the layers together. However, it is usually easier to cut the fabric layers once they are compiled together. After step 54, the composite may then be placed in a mold or an autoclave (step 56) to expose the composite to high temperatures and pressures in a subsequent step (step 60). The mold or autoclave may be designed to shape the composite into the intended shape of the blade seal.

As described above, the fabrics that form the composite may be preimpregnated with the resin. In alternative embodiments, the resin may be introduced into the composite (step 58) through other known techniques used in composite-formation, including, but not limited to, a wet lay-up process and resin transfer molding. In either case, the resin is cured in step 60 in order to form the laminate structure. The specific curing conditions depend, in part, on the particular polymeric resin and fabric makeup.

The laminate seal may include a coating that is applied to an underside of the laminate seal. The coating provides lubricity to the seal to reduce friction and wear between the seal and the part that the seal contacts. As described above in reference to step 52, coating 52C may be a layer of the pre-cured composite. In that case, coating 52C is co-molded with the fabric layers of the composite, and placed inside the mold or autoclave (step 56). Alternatively, the coating may be applied to the laminate (step 62) after the curing process. As such, the coating is secondarily bonded to an exposed layer of the laminate.

In step 64, minimal trimming of the laminate may be performed to create the appropriate size and shape of the laminate seal. At this point, the laminate seal may also undergo any necessary surface cleaning or preparation. The laminate seal may then be attached to the engine part (step 66).

The laminate seal described herein is designed for improved wear and thermal stability compared to previous air seal designs. Moreover, the molding process of the laminate facilitates greater sealing ability between the seal and the underlying engine part.

Figure 6A:
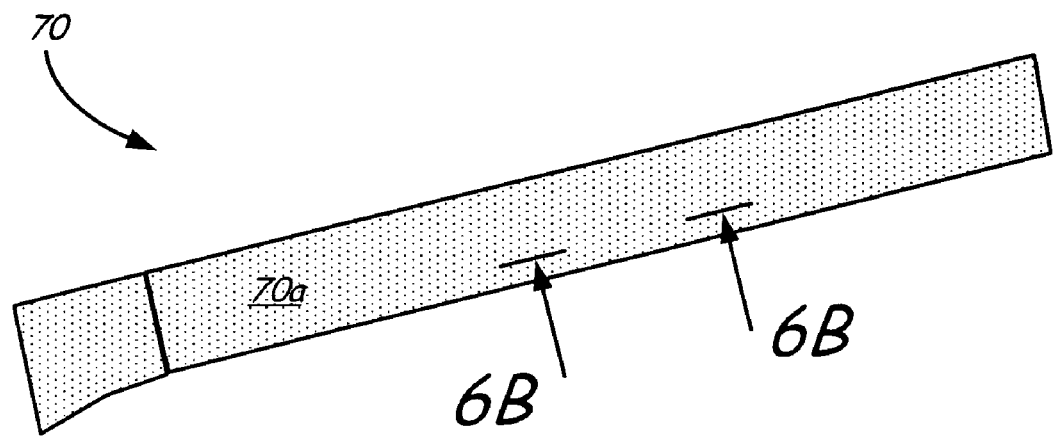
FIG. 6A is a schematic of an exemplary embodiment of a laminate air seal.
Figure 6B:
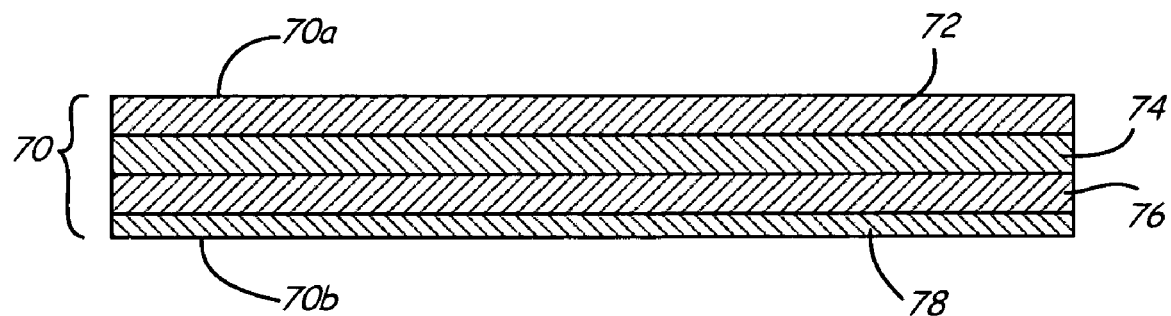
FIG. 6B is a cross-sectional view of the laminate air seal of FIG. 6 to illustrate the components of the air seal.

FIG. 6A is a perspective view of laminate air seal 70, which is similar to blade seals 26 and 28 of FIGS. 2 and 4. FIG. 6B illustrates a cross-section of laminate seal 70 to illustrate the composite layers of seal 70. In the exemplary embodiment shown in FIG. 6B, laminate seal 70 has first side 70a and second side 70b, and includes first fiberglass layer 72, carbon layer 74, second fiberglass layer 76, and coating 78. Seal 70 is designed such that first side 70a is exposed and second side 70b contacts a surface of the underlying engine part. For example, if laminate seal 70 is a blade seal for the pylon fairing, then second side 70b may contact metal face skin 44 of exhaust nozzle 14. In some cases, the surface of the underlying part may be covered by a wear strip, similar to rub strips 40 and 42 of FIGS. 2 and 4, which cover face skin 44.

In the exemplary embodiment of FIG. 6B, fabric layers 72, 74 and 76 are preimpregnated with a polymeric resin. Thus, fabrics 72, 74 and 76 are referred to as prepregs. Suitable resins include polyimide, bismaleimide (BMI) and cyanate ester. The particular resin may be selected, in part, based on its stability at the operating temperature of the region where the laminate seal is to be located. As described above, the laminate seal may be used at temperatures as low as approximately 400 degrees Fahrenheit (205 degrees Celsius) and temperatures up to or greater than approximately 600 degrees Fahrenheit (315 degrees Celsius).

Polyimide resins are well suited for gas turbine applications since they are able to resist wear and withstand high temperatures. Depending on the composition, polyimide resins are stable at temperatures up to approximately 650 degrees Fahrenheit (343 degrees Celsius). Both addition-formed polyimides and condensation polyimides may be used in laminate 70. In some cases, the condensation polyimides may have a higher thermal oxidative stability, as compared to the addition polyimides. An example of a polyimide resin is Avimid® N polyimide resin; Avimid® N prepregs are available with various types of fibers and may be purchased from Cytec Industries. Avimid® N is a condensation polyimide stable up to approximately 650 degrees Fahrenheit (343 degrees Celsius).

Bismaleimide (BMI) resins are stable at temperatures up to approximately 425 degrees Fahrenheit (218 degrees Celsius). An example of a BMI resin is Cycom® 5250-4 from Cytec Industries. Cycom® 5250-4 prepregs with various types of fibers may be purchased from Cytec Industries. Cyanate ester resins are stable at temperatures up to approximately 500 degrees Fahrenheit (260 degrees Celsius). Cyanate ester prepregs with various types of fibers may be purchased from YLA Inc.

In an alternative embodiment, the polymeric resin is introduced into fabric layers 72, 74 and 76 after the composite fabrics are assembled and placed into a mold. Resin transfer molding or known processes may be used to inject resin into the composite fabrics. The same types of resins described above—polyimide, BMI, and cyanate ester—may be used. The resins are commercially available from the companies provided above, Cytec Industries and YLA Inc. In addition, polyimide resins are available from Maverick Corporation and BMI resins are available from Hexcel.

In the embodiment shown in FIG. 6B, laminate seal 70 includes two fiberglass layers (72 and 76) and one carbon layer (74). It is recognized that more or less layers may be used to form the fabric composite, and additional materials may be included in the composite. Moreover, one or more of the fabric layers may be a hybrid of fiberglass and carbon fibers. In some embodiments, seal 70 may be formed of only fiberglass and resin, or, alternatively, only carbon and resin. The particular fabric makeup of seal 70 may be based, in part, on the temperature and strength requirements of the seal, as well as the wear requirements for the underlying part. The fibers in fabric layers 72, 74, and 76 may be oriented in any known form, including but not limited to tow, unidirectional, woven, non-woven, and mat. In preferred embodiments, woven fabric layers are used to form laminate seal 70.

As shown in FIG. 6B, seal 70 includes coating 78, which provides lubricity between surface 70b and an exposed surface of the part that seal 70 contacts. As described above, coating 78 may be a layer that is assembled with the fabric layers and is part of the curing process. Alternatively, coating 78 may be applied to the cured laminate seal.

In some embodiments, coating 78 is a film or coating formed from a polyimide and/or polytetrafluoroethylene (PTFE). Examples include, but are not limited to, Kapton® polyimide film from Dupont or Upilex® polyimide film from UBE Industries. Polytetrafluoroethylene (PTFE) is available from Dupont as Teflon® PTFE. Coating 78, in other embodiments, may be a woven material which may include PTFE and/or fiberglass. When coating 78 is secondarily bonded (i.e. after curing of fabric layers 72, 74 and 76), the polymeric resins described herein may also be used to bond coating 78 to layer 76. In some cases, the bondable surface of coating 78 may be etched prior to bonding with layer 76. Coating 78 may function, in some cases, as a sacrificial layer between seal 70 and the underlying part. In those cases, coating 78 may need to be periodically reapplied to seal 70.

As shown in FIGS. 3 and 4, exhaust nozzle 14 includes wear strips 40 and 42, which are designed to contact blade seals 26 and 28, respectively. In previous designs, wear strips 40 and 42 (as well as wear strips 36 and 38) have been formed from metal, commonly titanium. Wear strips 36, 38, 40 and 42 may be formed from a polyimide laminate. In one embodiment, wear strips 36, 38, 40 and 42 may be attached to face skin 44 using a polyimide adhesive.

It is not required that exhaust nozzle 14 include wear strips 36, 38, 40 and 42. With the improved design described herein, the laminate blade seal causes less wear on face skin 44, compared to a metal seal. There is less friction between the laminate seal and the surface, particularly if the laminate seal includes a lubricant coating. As such, polyimide wear strips are optional when laminate seal 70 is used to seal the gap between pylon fairing 20 and exhaust nozzle 14. In those embodiments which include wear strips 40 and 42, wear strips 40 and 42 may optionally include a lubricant coating, similar to coating 78 of seal 70.

In some embodiments, the coating on laminate 70 and/or wear strips 40 and 42 may be an antigallant material, which may include PTFE. Over time, the antigallant wears off and requires a periodic refreshment coating.

In the exemplary embodiment described herein, laminate air seal 70 is a blade seal configured to attach to a pylon fairing of the aircraft and seal a gap between the pylon fairing and the exhaust nozzle. It is recognized that the laminate seal described herein may be used in other areas of the engine that require or benefit from an air seal. The laminate seal is comprised of a composite of materials that are stable at operating temperatures of the gas turbine engine. As such, the laminate seal is a non-destructive, thermally stable structure that overcomes limitations of previous air seal designs.

Although the present invention has been described with reference to preferred embodiments, workers skilled in the art will recognize that changes may be made in form and detail without departing from the spirit and scope of the invention.

The invention claimed is:

1. A laminate seal for a gas turbine engine, the laminate seal comprising:
   one layer of carbon disposed between a first fiberglass layer and a second fiberglass layer;
   a polymeric resin stable at temperatures above 205 degrees Celsius, wherein the polymeric resin is cured such that the first fiberglass layer, the carbon layer, and the second fiberglass layer are bonded together to form the laminate seal; and
   a coating bonded to a surface of the laminate seal to add lubricity between the laminate seal and an underlying part to reduce wear therebetween.

2. The laminate seal of claim 1 wherein the coating includes one or both of polytetrafluoroethylene (PTFE) and polyimide.

3. The laminate seal of claim 1 wherein the polymeric resin is preimpregnated into the first fiberglass layer, the carbon layer, and the second fiberglass layer.

4. The laminate seal of claim 1 wherein the polymeric resin is polyimide.

5. The laminate seal of claim 1 wherein the polymeric resin includes one or both of bismaleimide (BMI) and cyanate ester.

6. A seal assembly for a gas turbine engine to seal air flow between a first engine part and a second engine part, the seal assembly comprising:
   a laminate configured to attach to the first engine part and comprising:
   a composite of a plurality of fabric layers, each layer of the plurality of fabric layers stable at an operating temperature of the gas turbine engine and including one layer of carbon disposed between two layers of fiberglass;
   a polymeric resin stable at the operating temperature of the gas turbine engine, wherein the resin is cured and thereby bonds the plurality of fabric layers together to form the laminate; and
   a lubricant coating bonded to a surface of the laminate to add lubricity between the laminate and an underlying wear strip to reduce wear on the second engine part caused by the laminate.

7. The seal assembly of claim 6 wherein the lubricant coating includes one or both of polytetrafluoroethylene (PTFE) and polyimide.

8. The seal assembly of claim 6 wherein the wear strip is formed from polyimide.

9. The seal assembly of claim 6 wherein the wear strip is attached to the second engine part.

10. The seal assembly of claim 6 wherein the first engine part is a pylon fairing and the second engine part is an exhaust nozzle.

11. The seal assembly of claim 6 wherein the operating temperature of the gas turbine engine is greater than 205 degrees Celsius.

12. The seal assembly of claim 6 wherein the polymeric resin is preimpregnated into the fabrics.

13. The seal assembly of claim 6 wherein the polymeric resin includes one or more of polyimide, bismaleimide (BMI), and cyanate ester.

14. A method of forming a laminate seal for a gas turbine engine, the method comprising:
    preparing a composite of a plurality of fabric layers and a polymeric resin, wherein the fabric layers include-one layer of carbon disposed between two layers of fiberglass and the fabric layers and the polymeric resin are stable at temperatures greater than 205 degrees Celsius;
    curing the resin such that the composite forms a laminate;
    bonding a lubricant coating to the laminate to reduce friction between the laminate and a second part of the gas turbine engine; and
    attaching the laminate to a first part of the gas turbine engine to seal a gap between a first part and the second part of the gas turbine engine.

15. The method of claim 14 wherein the first part of the gas turbine engine is a pylon fairing, and the second part is an exhaust nozzle.

16. The method of claim 14 wherein the polymeric resin is selected from a group consisting of polyimide, bismaleimide (BMI) and cyanate ester.

17. The method of claim 14 further comprising:
    attaching a polyimide wear strip to the second part of the gas turbine engine for contact with the laminate.

* * * * *